United States Patent
Heinrichs et al.

(10) Patent No.: US 6,316,650 B1
(45) Date of Patent: Nov. 13, 2001

(54) WAX PREPARATION COMPRISING PARTIAL ESTERS OF POLYOLS AND MONTAN WAX ACID AND CA SOAPS OF MONTAN WAX ACID

(75) Inventors: Franz-Leo Heinrichs; Monika Drechsler, both of Gablingen; Werner Kapfer; Andree Henze, both of Augsburg, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/464,821

(22) Filed: Dec. 17, 1999

(30) Foreign Application Priority Data

Dec. 19, 1998 (DE) .............................................. 198 58 852

(51) Int. Cl.[7] ............................ C07C 57/00; C07C 51/00
(52) U.S. Cl. ............................ 554/227; 554/156; 554/168
(58) Field of Search ................................... 554/168, 227, 554/156

Primary Examiner—Deborah D. Carr
(74) Attorney, Agent, or Firm—Susan S. Jackson; Scott E. Hanf

(57) ABSTRACT

The present invention relates to a wax mixture comprising a) 10–80% by weight of partial esters of polyols with carboxylic acids or carboxylic acid mixtures having a chain length of $C_{16}$–$C_{36}$;

b) 0–30% by weight of partial esters of polyols with polybasic carboxylic acids having a chain length of $C_4$–$C_{36}$; and c) 20–90% by weight of alkaline earth metal soaps of the abovementioned carboxylic acids or carboxylic acid mixtures, with the proviso that 1,2-ethanediol and 1,3-butanediol are excluded. The wax mixtures are highly suitable for the preparation of solvent pastes as a single component or in combination with synthetic, natural or semi-synthetic wax-like products, as lubricants or release agents in plastic or metal processing, and for the preparation of microfine wax powders.

10 Claims, No Drawings

WAX PREPARATION COMPRISING PARTIAL ESTERS OF POLYOLS AND MONTAN WAX ACID AND CA SOAPS OF MONTAN WAX ACID

BACKGROUND OF THE INVENTION

The present invention relates to a wax preparation, to a process for the preparation thereof, and to the use thereof.

Combinations of Ca soaps of montan wax acid and eaters of dihydric alcohols having a high degree of esterification have been produced industrially for a long time and are employed as waxes for the preparation of solvent pastes or as lubricants and release agents.

For use in solvent pastes, use is made in particular of esters of 1,2-ethanediol and/or 1,3-butanediol having degrees of esterification of >90%. The proportion of Ca soap in the mixtures is about 45% by weight, corresponding to a Ca content of about 1.5% by weight. Such products are, for example, "Wax OP®" and "Wax O®" from Clariant GmbH and "Wax OP®" from BASF.

These waxes are prepared by virtually complete reaction of the alcohol component with a calculated excess of acid, followed by neutralization of the excess acid by addition of $Ca(OH)_2$. Since distribution of the $Ca(OH)_2$ is always difficult, an excess is used, which then has to be separated off by filtration or centrifugation. Characteristic properties of these products are a viscosity (DGF-M-III 8 (75)) of about 400 mPas and a drop point (DGF-M-III 3 (75)) of 99–105° C.

These products compete with synthetic waxes and natural waxes, such as, for example, carnauba wax.

For use in solvent pastes for shoe care, carnauba in particular offers the advantage that it forms solid, heat-stable and glossy pastes which are preferred over applications of pure montan wax derivatives. The disadvantage is that carnauba is not available in constant amounts and quality.

The object was therefore to prepare a product for "solvent-based paste" applications which has the same or better properties than carnauba, but can be produced economically in constant quality.

SUMMARY OF THE INVENTION

Surprisingly, it has been found that partial esters of polyhydric alcohols, for example glycerol, diglycerol, polyglycerol, trimethylolpropane, di-trimethylolpropane, pentaerythritol, dipentaerythritol, sorbitol and sorbitan N-alkylglucamines, in combination with the Ca soap of montan wax acid, prepared by a novel process, satisfy these requirements.

The invention thus relates to a wax mixture comprising
 a) 10–80% by weight of partial esters of polyols with mono-carboxylic acids or monocarboxylic acid mixtures having a chain length of $C_{16}$–$C_{36}$;
 b) 0–30% by weight of partial esters of polyols with polybasic carboxylic acids having a chain length of $C_4$–$C_{36}$; and
 c) 20–90% by weight of alkaline earth metal soaps of the abovementioned carboxylic acids or carboxylic acid mixtures, with the proviso that 1,2-ethanediol and 1,3-butanediol are excluded.

DESCRIPTION OF THE PREFERRED EMBODIMENTS

Particularly suitable are wax mixtures in which the proportion of OH groups in the alcohol component is $\geq 2$, and in which polyhydric primary alcohols, their dimers or oligomers and/or their ethoxylation products or polyhydric alcohols containing primary and secondary OH groups are employed.

Preferred polybasic carboxylic acids here are dibasic and tribasic carboxylic acids.

The paste-forming action of the products can be further supported by the specific addition of dicarboxylic acids.

Particular preference given to, for example, citric acid tartaric acid, malic acid, itaconic acid, maleic acid, adipic acid, sebacic acid, dodecanedioc acid, dimeric fatty acid, phthalic acid or terephthalic acid.

The desired effect is achieved by preparing the partial esters in a first step by esterifying the polyols. The degree of esterification here is less than 90%, preferably between 30 and 70%. In a second step, a basic Ca compound, preferably $Ca(OH)_2$, is then dispersed in the ester, which can be achieved without difficulties. Only then, in the third step, is the soap prepared by addition of wax acid. The proportion of soap can be adjusted to the optimum value by varying the Ca/montan wax acid amount and varies between 20 and 70% by weight, corresponding to a Ca content of 1–3% by weight.

The products having a Ca content of 1.6% by weight are characterized by a viscosity (DGF-M-III 8 (75)) of about 300 mPas and a drop point (DGF-M-III 3 (75)) of 105–115° C.

The wax mixtures according to the invention are highly suitable for the preparation of solvent pastes as a single component or in combination with synthetic, natural or semi-synthetic wax-like products and as lubricants and release agents in plastic and metal processing. They are also very highly suitable for the preparation of microfine wax powders.

EXAMPLES

PREPARATION EXAMPLES

Comparative Example 1

Wax OP

| | |
|---|---|
| Wax S | 100 kg |
| Butylene glycol | 8.5 kg |
| $Ca(OH)_2$ | 3 kg |
| $H_2SO_4$ | 30 ml |

Wax S and butylene glycol are stirred at 110–115° C. together with the sulfuric acid. As soon as the acid number of the mixture has dropped to 50, it is pressed into the saponifier, and $Ca(OH)_2$ is added. The mixture is stirred until the acid number is between 12 and 14.

Comparative Example 2
Wax O

| Wax S | 100 kg |
|---|---|
| Ethylene glycol | 4.9 kg |
| Ca(OH)$_2$ | 3 kg |
| H$_2$SO$_4$ | 30 ml |

Wax S and ethylene glycol are stirred at 110–115° C. together with the sulfuric acid. As soon as the acid number of the mixture has dropped to 50, it is pressed into the saponifier, and Ca(OH)$_2$ is added. The mixture is stirred until the acid number is between 12 and 14.

Example 1
Mixture of Ca Soap and Glycerol Partial Ester of Montan Wax Acid

| Glycerol ester of montan wax acid | 600 kg |
|---|---|
| Montan wax acid | 400 kg |
| Ca(OH)$_2$ | 30 kg |

Montan wax acid and glycerol are mixed in a molar ratio of 1:2 and esterified to an acid number of 20 in a known manner. When the target acid number has been reached, the reaction is terminated by addition of Ca(OH)$_2$. The mixture is stirred intensively until all the Ca(OH)$_2$ is finely divided. The amount of montan wax acid calculated for soap preparation is carefully metered into this mixture. The metering rate is set so that overfoaming is avoided. The batch is stirred until the acid number is 20–30, and is then worked up.

Example 2
Mixture of Ca Soap and Diglycerol Partial Ester of Montan Wax Acid

| Diglycerol ester of montan wax acid | 600 kg |
|---|---|
| Montan wax acid | 400 kg |
| Ca(OH)$_2$ | 30 kg |

Montan wax acid and diglycerol are mixed in a molar ratio of 1:2 and esterified to an acid number of 20 in a known manner. When the target acid number has been reached, the reaction is terminated by addition of Ca(OH)$_2$. The mixture is stirred intensively until all the Ca(OH)$_2$ is finely divided. The amount of montan wax acid calculated for soap preparation is carefully metered into this mixture. The metering rate is set so that overfoaming is avoided. The batch is stirred until the acid number is 20–30, and is then worked up.

Example 3
Mixture of Ca Soap and Sorbitol Partial Ester of Montan Wax Acid

| Sorbitol ester of montan wax acid | 600 kg |
|---|---|
| Montan wax acid | 400 kg |
| Ca(OH)$_2$ | 30 kg |

Montan wax acid and sorbitol are mixed in a molar ratio of 1:2 and esterified to an acid number of 20 in a known manner. When the target acid number has been reached, the reaction is terminated by addition of Ca(OH)$_2$. The mixture is stirred intensively until all the Ca(OH)$_2$ is finely divided. The amount of montan wax acid calculated for soap preparation is carefully metered into this mixture. The metering rate is set so that overfoaming is avoided. The batch is stirred until the acid number is 20–30, and is then worked up.

Example 4
Mixture of Ca soap and trimethylolpropane partial ester of montan wax acid

| Trimethylolpropane ester of montan wax acid | 600 kg |
|---|---|
| Montan wax acid | 400 kg |
| Ca(OH)$_2$ | 30 kg |

Montan wax acid and trimethylolpropane are mixed in a molar ratio of 1:2 and esterified to an acid number of 10 in a known manner, 0.2 mol of sebacic acid is added to the reaction mixture, which is then stirred further until an acid number of about 20 has been reached. When the target acid number has been reached, the reaction is terminated by addition of Ca(OH)$_2$. The mixture is stirred intensively until all the Ca(OH)$_2$ is finely divided. The amount of montan wax acid calculated for soap preparation is carefully metered into this mixture. The metering rate is set so that overfoaming is avoided. The batch is stirred until the acid number is 20–30, and is then worked up.

Applicational Testing in Solvent Pastes

TABLE 1

| | Test formulations | | |
|---|---|---|---|
| | OA Oil absorption | 7/18 NOZ | |
| Test wax | 20 | 7 | % |
| Paraffin | | 17 | % |
| Microwax | | 1 | % |
| White spirit | 80 | 75 | % |
| MT | 23 | 23, 30, 40 | ° C. |
| PT | 50, 60 | 50 | ° C. |

| Paste hardness OA | Paste hardness 7/18 NOZ |
|---|---|

TABLE 1-continued

Test formulations

| Type | Journal No. | PT 50° C. g/cm² | PT 60° C. g/cm² | MT 20° C. g/cm² | MT 30° C. g/cm² | MT 40° C. g/cm² | Gloss |
|---|---|---|---|---|---|---|---|
| Trimethylolpropane | 2391/2 | 1480 | 1510 | 2160 | 730 | 210 | h |
| ester Ca soap | 2392/2 | 1450 | 1620 | 1840 | 820 | 260 | m |
| Glycerol ester Ca | 2396 | 350 | 390 | 570 | 300 | 160 | |
| soap | 2395/2 | 880 | 980 | 880 | 370 | 260 | |
| | 2394/2 | 750 | 1190 | 910 | 310 | 200 | |
| | 2393/2 | 910 | 830 | 1030 | 820 | 260 | |
| | 2401 | 790 | 850 | 1090 | 420 | 210 | |
| Diglycerol ester Ca | 2294/2 | 1910 | 1710 | 1450 | 540 | 310 | m |
| soap | 2300/2 | 820 | 960 | 1390 | 650 | 260 | m |
| Sorbitol ester Ca | 2398 | 950 | 800 | 1460 | 560 | 350 | m |
| soap | | | | | | | |
| Wax OP | 21141 | 460 | 910 | 930 | 350 | 230 | |
| Wax O | 459576 | 780 | 870 | 1230 | 340 | 330 | |
| h | high gloss | | | | | | |
| m | matt | | | | | | |
| s | satin | | | | | | |
| PT | pouring temperature | | | | | | |
| MT | measurement temperature | | | | | | |
| Complex ester Ca | 2337 | 2430 | 2080 | 1060 | 540 | 120 | |
| soap | 2338 | 2380 | 2460 | 1320 | 480 | 120 | |
| | 2339 | 2180 | 2180 | 1540 | 320 | 120 | |
| | 2353 | 2080 | 2000 | 970 | 360 | 210 | s |
| Glycerol ester Ca | 2340 | 1180 | 1150 | 1270 | 270 | 150 | s |
| soap | 2342 | 1200 | 1120 | 1470 | 320 | 150 | s |
| | 2346 | 940 | 1290 | 1520 | 250 | 150 | s |
| | 2347 | 980 | 1300 | 1270 | 320 | 230 | h |
| | 2351 | 1050 | 1100 | 670 | 240 | 150 | |
| Diglycerol ester Ca | 2341 | 720 | 900 | 350 | 170 | 100 | s |
| soap | 2343 | 560 | 800 | 660 | 320 | 190 | m |
| | 2344 | 830 | 1080 | 330 | 150 | 50 | m |
| | 2345 | 890 | 1350 | 530 | 260 | 150 | m |
| | 2348 | 1070 | 1370 | 510 | 280 | 100 | m |
| | 2349 | 660 | 1090 | 430 | 240 | 100 | m |
| | 2350 | 780 | 1180 | 480 | 160 | 100 | |
| | 2352 | 720 | 1010 | 700 | 400 | 160 | |
| Sorbitol ester Ca | 2356 | 1260 | 1260 | 610 | 330 | 200 | h |
| soap | 2357 | 1300 | 1300 | 600 | 280 | 210 | h |
| | 2360 | 1400 | 1400 | 710 | 330 | 160 | h |
| | 2361 | 1420 | 1420 | 660 | 290 | 190 | h |
| Wax OP | | 710 | 500 | 950 | 310 | 150 | |
| Wax O | | 780 | 670 | 480 | 150 | 0 | |
| WE 40 | | 1440 | 1310 | 1040 | 350 | 150 | |

What is claimed is:

1. A wax mixture comprising
   a) 10–80% by weight of partial esters of polyols with mono-carboxylic acids or monocarboxylic acid mixtures having a chain length of $C_{16}$–$C_{36}$;
   b) 0–30% by weight of partial esters of polyols with polybasic carboxylic acids having a chain length of $C_4$–$C_{36}$; and
   c) 20–90% by weight of alkaline earth metal soaps of the abovementioned carboxylic acids or carboxylic acid mixtures, with the proviso that 1,2-ethanediol and 1,3-butanediol are excluded.

2. The wax mixture as claimed in claim 1, wherein the polyols have a proportion of OH groups $\geq 2$, and wherein the polyols, dimers or oligomers of the polyols, ethoxylation products of the polyols, or a combination thereof or polyols containing primary and secondary OH groups are employed.

3. A wax mixture as claimed in claim 1, wherein the degree of esterification is less than 90%.

4. A wax mixture as claimed in claim 1, wherein the degree of esterification is between 30 and 70%.

5. A wax mixture as claimed in claim 1, wherein the polybasic carboxylic acid employed is a tribasic or dibasic carboxylic acid.

6. A wax mixture as claimed in claim 1, wherein citric acid, tartaric acid, malic acid, itaconic acid, maleic acid, adipic acid, sebacic acid, dodecanedioc acid, dimeric fatty acid, phthalic acid or terephthalic acid is employed.

7. A process for the preparation of a wax mixture wherein the wax mixture is comprised of:

10–80% by weight of partial esters of polyols with mono-carboxylic acids or monocarboxylic acid mixtures having a chain length of $C_{16}$–$C_{36}$;

0–30% by weight of partial esters of polyols with polybasic carboxylic acids having a chain length of $C_4$–$C_{36}$; and 20–90% by weight of alkaline earth metal soaps of the above mentioned carboxylic acids or carboxylic acid mixtures;

with the proviso that 1,2-ethanediol and 1,3-butanediol are excluded; the process comprising:
   a) in the first step, esterifying a polyol to form a partial ester,
   b) in the second step, adding a requisite amount of a Ca compound to the partial ester,
   c) in the third step, adding a wax acid and preparing a soap.

8. A method of using a wax mixture for the preparation of solvent pastes wherein the wax mixture is comprised of:

- 10–80% by weight of partial esters of polyols with mono-carboxylic acids or monocarboxylic acid mixtures having a chain length of $C_{16}$–$C_{36}$;
- 0–30% by weight of partial esters of polyols with polybasic carboxylic acids having a chain length of $C_4$–$C_{36}$; and
- 20–90% by weight of alkaline earth metal soaps of the above mentioned carboxylic acids or carboxylic acid mixtures;

with the proviso that 1,2-ethanediol and 1,3-butanediol are excluded; the method comprising adding the wax mixture as a single component or in combination with a synthetic, natural or semi-synthetic wax-like product to a paste.

9. A method of using a wax mixture wherein the wax mixture is comprised of:

- 10–80% by weight of partial esters of polyols with mono-carboxylic acids or monocarboxylic acid mixtures having a chain length of $C_{16}$–$C_{36}$;
- 0–30% by weight of partial esters of polyols with polybasic carboxylic acids having a chain length of $C_4$–$C_{36}$; and
- 20–90% by weight of alkaline earth metal soaps of the above mentioned carboxylic acids or carboxylic acid mixtures;

with the proviso that 1,2-ethanediol and 1,3-butanediol are excluded; the method comprising adding the wax mixture as a lubricant or release agent in plastic or metal processing.

10. A method of using a wax mixture for the preparation of microfine wax powders wherein the wax mixture is comprised of:

- 10–80% by weight of partial esters of polyols with mono-carboxylic acids or monocarboxylic acid mixtures having a chain length of $C_{16}$–$C_{36}$;
- 0–30% by weight of partial esters of polyols with polybasic carboxylic acids having a chain length of $C_4$–$C_{36}$; and
- 20–90% by weight of alkaline earth metal soaps of the above mentioned carboxylic acids or carboxylic and mixtures;

with the proviso that 1,2-ethanediol and 1,3-butanediol are excluded; the method comprising adding the wax mixture to a powder.

* * * * *